US010413886B2

(12) United States Patent
Despres et al.

(10) Patent No.: US 10,413,886 B2
(45) Date of Patent: Sep. 17, 2019

(54) DOUBLE-LAYER THREE-WAY CATALYST WITH IMPROVED AGING STABILITY

(71) Applicant: UMICORE AG & CO. KG, Hanau-Wolfgang (DE)

(72) Inventors: Joel Despres, Rodenbach (DE); Joerg-Michael Richter, Frankfurt (DE); Martin Roesch, Rodgau (DE); Nicole Schichtel, Butzbach Hoch-Weisel (DE); Marcus Schmidt, Ginsheim (DE); Jan Schoenhaber, Darmstadt (DE); Stephanie Spiess, Darmstadt (DE); Anke Wolf, Darmstadt (DE)

(73) Assignee: UMICORE AG & CO. KG, Hanau-Wolfgang (DE)

( * ) Notice: Subject to any disclaimer, the term of this patent is extended or adjusted under 35 U.S.C. 154(b) by 0 days.

(21) Appl. No.: 15/544,091

(22) PCT Filed: Jan. 15, 2016

(86) PCT No.: PCT/EP2016/050718
§ 371 (c)(1),
(2) Date: Jul. 17, 2017

(87) PCT Pub. No.: WO2016/116356
PCT Pub. Date: Jul. 28, 2016

(65) Prior Publication Data
US 2017/0368536 A1    Dec. 28, 2017

(30) Foreign Application Priority Data

Jan. 19, 2015  (EP) .................................... 15151583

(51) Int. Cl.
*B01J 23/42* (2006.01)
*B01J 23/44* (2006.01)
*B01J 23/56* (2006.01)
*B01J 23/63* (2006.01)
*B01J 21/06* (2006.01)
*B01J 35/00* (2006.01)
*B01J 37/02* (2006.01)
*B01D 53/94* (2006.01)
*B01J 23/46* (2006.01)

(52) U.S. Cl.
CPC ............ *B01J 23/56* (2013.01); *B01D 53/945* (2013.01); *B01D 53/9468* (2013.01); *B01J 21/066* (2013.01); *B01J 23/63* (2013.01); *B01J 35/0006* (2013.01); *B01J 37/0244* (2013.01); *B01J 37/0248* (2013.01); *B01D 2255/1023* (2013.01); *B01D 2255/1025* (2013.01); *B01D 2255/2042* (2013.01); *B01D 2255/2061* (2013.01); *B01D 2255/2063* (2013.01); *B01D 2255/2065* (2013.01); *B01D 2255/2092* (2013.01); *B01D 2255/20715* (2013.01); *B01D 2255/407* (2013.01); *B01D 2255/9022* (2013.01); *B01J 23/42* (2013.01); *B01J 23/44* (2013.01); *B01J 23/464* (2013.01); *Y02T 10/22* (2013.01)

(58) Field of Classification Search
CPC .......... B01J 23/42; B01J 23/44; B01J 23/464; B01J 23/56; B01J 23/63; B01J 21/066; B01J 35/0006
See application file for complete search history.

(56) References Cited

U.S. PATENT DOCUMENTS

| | | | | |
|---|---|---|---|---|
| 7,081,430 B2 * | 7/2006 | Uenishi | ................ | B01D 53/945 502/304 |
| 7,550,124 B2 * | 6/2009 | Chen | .................... | B01D 53/945 423/213.2 |
| 7,608,561 B2 * | 10/2009 | Miyoshi | ............... | B01D 53/945 502/304 |
| 7,758,834 B2 * | 7/2010 | Chen | .................... | B01D 53/945 423/213.2 |
| 7,875,250 B2 * | 1/2011 | Nunan | ................. | B01D 53/945 422/168 |
| 7,981,390 B2 * | 7/2011 | Galligan | ................ | B01J 23/002 423/213.5 |
| 8,007,750 B2 * | 8/2011 | Chen | .................... | B01D 53/945 423/239.1 |

(Continued)

FOREIGN PATENT DOCUMENTS

EP    0885650 A2    12/1998
EP    1046423 A2    10/2000
(Continued)

OTHER PUBLICATIONS

International Search Report for PCT/EP2016/050718, dated May 23, 2016 in English Language.

*Primary Examiner* — Cam N. Nguyen
(74) *Attorney, Agent, or Firm* — Smith, Gambrell & Russell, LLP

(57) ABSTRACT

The present invention relates to a catalyst comprising two layers on an inert catalyst carrier, wherein a layer A lying directly on the catalyst carrier contains at least one platinum group metal and one cerium/zirconium/SE mixed oxide, and a layer B, applied on layer A and in direct contact with the flow of exhaust gas, contains at least one platinum group metal and a cerium/zirconium/SE mixed oxide, wherein SE stands for a rare earth metal other than from cerium, characterized in that the fraction of SE oxide in the cerium/zirconium/SE mixed oxide of layer A is less than the fraction of SE oxide in the cerium/zirconium/SE mixed oxide of layer B.

21 Claims, No Drawings

(56) References Cited

U.S. PATENT DOCUMENTS

| | | | | |
|---|---|---|---|---|
| 8,038,951 | B2* | 10/2011 | Wassermann | B01J 21/066 422/168 |
| 8,066,963 | B2* | 11/2011 | Klingmann | B01D 53/944 423/213.5 |
| 8,202,819 | B2* | 6/2012 | Kohara | B01D 53/9468 502/304 |
| 8,337,791 | B2* | 12/2012 | Kohara | B01D 53/945 423/213.2 |
| 8,617,496 | B2* | 12/2013 | Wei | B01J 23/63 423/213.2 |
| 8,833,064 | B2* | 9/2014 | Galligan | B01D 53/945 60/299 |
| 9,266,092 | B2* | 2/2016 | Arnold | B01J 23/63 |
| 9,486,793 | B2* | 11/2016 | Klingmann | B01J 37/024 |
| 9,550,176 | B2* | 1/2017 | Sato | B01J 37/03 |
| 9,656,209 | B2* | 5/2017 | Chang | B01D 53/945 |
| 9,744,529 | B2* | 8/2017 | Xue | B01J 35/0006 |
| 9,981,258 | B2* | 5/2018 | Xue | B01J 35/0006 |
| 2010/0135879 | A1 | 6/2010 | Roesch et al. | |
| 2010/0263357 | A1 | 10/2010 | Lindner et al. | |

FOREIGN PATENT DOCUMENTS

| | | |
|---|---|---|
| EP | 1541220 A1 | 6/2005 |
| EP | 1726359 A1 | 11/2006 |
| EP | 1900416 A2 | 3/2008 |
| EP | 1974809 A1 | 10/2008 |
| WO | 95/35152 | 12/1995 |
| WO | 2008/000449 A2 | 1/2008 |
| WO | 2009/012348 A1 | 1/2009 |
| WO | 2011/056763 A2 | 5/2011 |

* cited by examiner

DOUBLE-LAYER THREE-WAY CATALYST WITH IMPROVED AGING STABILITY

The present invention relates to a three-way catalyst which is composed of catalytically-active layers arranged on top of each other and which is suitable for cleaning exhaust gases from combustion engines.

Three-way catalysts are used for cleaning exhaust gases from essentially stoichiometrically-operated combustion engines. In a stoichiometric operation, the quantity of air fed to the engine corresponds exactly to the quantity required for complete fuel combustion. In this case, the air-fuel ratio λ—also known as the air ratio—is exactly 1. Three-way catalysts at around λ=1 are able to simultaneously convert hydrocarbons, carbon monoxide, and nitrogen oxides to harmless compounds.

In general, platinum group metals are used as catalytically-active materials—particularly, platinum, palladium, and rhodium—that, for example, are present on λ-aluminum oxide as support material. In addition, three-way catalysts contain oxygen-storing materials, e.g., cerium/zirconium mixed oxides. In the latter case, cerium oxide, a rare-earth metal oxide, constitutes the component that is fundamental to the oxygen storage. Along with zirconium oxide and cerium oxide, these materials may contain additional components, such as rare-earth metal oxides or alkaline earth oxides. Oxygen-storing materials are activated by applying catalytically-active materials, such as platinum group metals, and therefore also serve as support material for the platinum group metals.

The components of a three-way catalyst may be present in a single coating layer on an inert catalyst support; see, for example, EP1541220A1.

Frequently used, however, are double-layer catalysts, which facilitate a separation of different catalytic processes and, therefore, enable an optimal coordination of the catalytic effects in the two layers. Catalysts of the latter type are disclosed, for example, in WO95/35152A1, WO2008/000449A2, EP0885650A2, EP1046423A2, EP1726359A1, and EP1974809A1.

EP1974809A1 discloses double-layer, three-way catalysts that contain cerium/zirconium mixed oxides in both layers, wherein the cerium/zirconium mixed oxide in the top layer has a higher proportion of zirconium respectively than that in the bottom layer.

EP 1900416A2 describes double-layer, three-way catalysts that contain mixed oxides of cerium, zirconium, and niobium in both layers and, additionally, CeZrYLa aluminum oxide particles in the bottom layer.

EP1726359A1 describes double-layer, three-way catalysts that, in both layers, contain cerium/zirconium/lanthanum/neodymium mixed oxides with a zirconium content of more than 80 mol %, wherein the cerium/zirconium/lanthanum/neodymium mixed oxide in the top layer may have a higher proportion of zirconium respectively than that in the bottom layer.

WO2008/000449A2 also discloses double-layer catalysts that contain cerium/zirconium mixed oxides in both layers, and wherein the mixed oxide in the top layer again has a higher proportion of zirconium. To some extent, the cerium/zirconium mixed oxides may also be replaced by cerium/zirconium/lanthanum/neodymium mixed oxides or cerium/zirconium/lanthanum/yttrium mixed oxides.

WO2009/012348A1 even describes three-way catalysts wherein only the middle and the top layers contain oxygen-storing materials.

The constantly increasing demand for a reduction in emissions from combustion engines requires the continuous further development of catalysts. In Europe, the durability requirements have been increased with the legislative stage Euro 5 to 160,000 km. The USA even has durability requirements of up to 150,000 miles. Therefore, the aging stability of the catalysts has become even more important. The key criteria for the activity after aging are, on the one hand, the catalyst's start-up temperatures for the conversion of the pollutants and, on the other, its dynamic conversion capacity. The start-up temperature for a pollutant indicates the temperature from which this pollutant will be converted by more than, for example, 50%. The lower these temperatures are, the sooner the pollutants can be converted after a cold start. At full load, exhaust gas temperatures of up to 1,050° C. can occur directly at the motor output. The better the catalyst's temperature stability, the closer it can be arranged to the engine. This also improves exhaust gas cleaning after a cold start. When the Euro 6c stage comes into force in September 2017, European emission legislation will stipulate exhaust gas measurements under actual driving conditions. Depending upon driving conditions, this can mean that the catalyst will be subjected to much more demanding requirements—particularly with respect to the dynamic conversion of carbon monoxide and nitrogen oxides. These stringent requirements must be met even after strong aging of the catalyst. For this reason as well, the aging stability of three-way catalysts must be further increased.

The catalysts according to the aforementioned prior art have very good properties with regard to start-up temperatures and dynamic conversion capacity after aging. However, the increased legal requirements make it necessary to search for even better catalysts. For this reason, it was the problem of this invention to provide a catalyst that, due to its higher temperature stability, has even lower start-up temperatures and an improved dynamic conversion capacity after aging, compared to the catalysts of prior art.

Surprisingly, it was found that this problem can be solved if the rare-earth elements present as components of the oxygen-storing materials, as well as, potentially, the platinum group metals, are distributed in a specific way on the two layers of a double-layer, three-way catalyst.

The subject-matter of the present invention is, therefore, a catalyst comprising two layers on an inert catalyst support, wherein a layer A contains at least one platinum group metal, as well as a cerium/zirconium/SE mixed oxide, and a layer B applied to layer A contains at least one platinum group metal, as well as a cerium/zirconium/SE mixed oxide, wherein SE stands for a rare-earth metal other than cerium, characterized in that the proportion of the SE oxide in the cerium/zirconium/SE mixed oxide of layer A is less than the proportion of the SE oxide in the cerium/zirconium/SE mixed oxide of layer B, calculated respectively in wt % and relative to the cerium/zirconium/SE mixed oxide.

Layer A and layer B, independently of each other, contain, in particular, platinum, palladium, rhodium, or mixtures of at least two of these platinum group metals, as platinum group metal.

In embodiments of the present invention, layer A contains platinum, palladium, or platinum and palladium, and layer B contains palladium, rhodium, or palladium and rhodium.

In further embodiments of the present invention, the catalyst according to the invention is free of platinum.

In particular, layer A contains palladium, and layer B contains rhodium, or palladium and rhodium.

Cerium/zirconium/SE mixed oxides may serve as support materials for the platinum group metals in layer A and/or in layer B. Furthermore, in layer A and/or in layer B, they can be supported wholly or in part on active aluminum oxide.

Therefore, in embodiments of the present invention, layer A and layer B contain active aluminum oxide. It is particularly preferable for the active aluminum oxide to be stabilized by means of doping—particularly, with lanthanum oxide. Preferred active aluminum oxides contain 1 to 6 wt %—in particular, 3 to 4 wt %—of lanthanum oxide ($La_2O_3$).

The term, "active aluminum oxide," is known to the person skilled in the art. In particular, it designates λ-aluminum oxide with a surface of 100 to 200 $m^2/g$ of active aluminum oxide, has been described many times in the literature, and is commercially available.

The term, "cerium/zirconium/SE mixed oxide," within the meaning of the present invention excludes physical mixtures of cerium oxide, zirconium oxide, and SE oxide. In fact, "cerium/zirconium/SE mixed oxides" are characterized by a largely homogeneous, three-dimensional crystal structure, which is ideally free of phases from cerium oxide, zirconium oxide, or SE oxide. However, depending upon the manufacturing process, completely homogeneous products may occur, which can generally be used without any disadvantage.

Lanthanum oxide, yttrium oxide, praseodymium oxide, neodymium oxide, samarium oxide, and mixtures of one or more of these metal oxides may, for example, be considered as rare-earth metal oxides in the cerium/zirconium/SE mixed oxides. Lanthanum oxide, yttrium oxide, praseodymium oxide, and mixtures of one or more of these metal oxides are preferred. Particularly preferred are lanthanum oxide and yttrium oxide, and a mixture of lanthanum oxide and yttrium oxide is quite particularly preferred.

According to the invention, the proportion of the SE oxide in the cerium/zirconium/SE mixed oxide of layer A is less than the proportion of the SE oxide in the cerium/zirconium/SE mixed oxide of layer B, calculated respectively in wt % and relative to the cerium/zirconium/SE mixed oxide.

The proportion of the SE oxide in layer A is, in particular, 1 to 12 wt %—preferably, 3 to 10 wt %, and even more preferably, 6 to 9 wt %—relative to the cerium/zirconium/SE mixed oxide in each case.

The proportion of the SE oxide in layer B is, in particular, 2 to 25 wt %—preferably, 10 to 20 wt %, and even more preferably, 14 to 18 wt %—relative to the cerium/zirconium/SE mixed oxide in each case.

According to the invention, the ratio of cerium oxide to zirconium oxide in the cerium/zirconium/SE mixed oxides may vary widely. In layer A, it is, for example, 0.1 to 1.0 preferably, from 0.2 to 0.7, and even more preferably, from 0.3 to 0.5. In layer B, it is, for example, 0.1 to 1.0— preferably, from 0.2 to 0.7, and even more preferably, from 0.3 to 0.5.

The cerium/zirconium/SE mixed oxides in the present invention do not, in particular, contain aluminum oxide.

In embodiments of the present invention, one layer or both layers contain alkaline earth compounds, such as barium oxide or barium sulfate. Preferred embodiments contain barium sulfate in layer A. The quantity of barium sulfate amounts, in particular, to 5 to 20 g/L of the volume of the inert catalyst support.

In further embodiments of the present invention, one or both layers additionally contain additives, such as rare-earth-based compounds, e.g., lanthanum oxide, and/or binders, e.g., aluminum compounds. These additives are used in quantities that may vary widely and which the person skilled in the art may determine in a specific case by simple means.

One embodiment of the present invention relates to a catalyst comprising two layers on an inert catalyst support, wherein a layer A contains palladium, active aluminum oxide, as well as a cerium/zirconium/lanthanum/yttrium mixed oxide, and a layer B applied to layer A contains rhodium, or palladium and rhodium, active aluminum oxide, as well as a cerium/zirconium/lanthanum/yttrium mixed oxide, characterized in that the proportion of the sum of lanthanum oxide and yttrium oxide in the cerium/zirconium/lanthanum/yttrium mixed oxide of layer A is less than the proportion of the sum of lanthanum oxide and yttrium oxide in the cerium/zirconium/lanthanum/yttrium mixed oxide of layer B, calculated respectively in wt % and relative to the cerium/zirconium/lanthanum/yttrium oxide, In this case, it is preferable for the proportion of the sum of lanthanum oxide and yttrium oxide in the cerium/zirconium/lanthanum/yttrium mixed oxide of layer A to be 6 to 9 wt % relative to the cerium/zirconium/lanthanum/yttrium mixed oxide of layer A, and 14 to 18 wt % in the cerium/zirconium/lanthanum/yttrium mixed oxide of layer B relative to the cerium/zirconium/lanthanum/yttrium mixed oxide of layer B, calculated in each case in wt % and relative to the cerium/zirconium/lanthanum/yttrium mixed oxide.

In a further embodiment of the present invention, layer A lies directly on the inert catalyst support, i.e., there is no additional layer or no undercoat between the inert catalyst support and layer A.

In a further embodiment of the present invention, layer B is in direct contact with the exhaust gas stream, i.e., there is no additional layer or no overcoat on layer B.

In a further embodiment of the present invention, the catalyst according to the invention consists of layers A and B on an inert catalyst support. This means that layer A lies directly on the inert catalyst support, layer B is in direct contact with the exhaust gas stream, and no other layers are present.

Honeycomb bodies made from ceramic or metal with a volume V, which have parallel flow channels for the exhaust gases of the combustion engine, are particularly suitable as catalytically-inert catalyst supports. They may be either so-called flow-through honeycomb bodies or wall-flow filters.

According to the invention, the wall areas of the flow canals are coated with the two catalyst layers A and B. To coat the catalyst support with layer A, the solids provided for this layer are suspended in water and coated with the catalyst supports' coating suspension that is thus obtained. The process is repeated with a coating suspension, in which the solids that are provided for layer B are suspended in water. Preferably, both layer A and layer B are coated along the entire length of the inert catalyst support. This means that layer B completely covers layer A, and, as a result, only layer B comes into direct contact with the exhaust gas stream.

In the following examples 1 to 3, and in comparative example 1, double-layer catalysts were produced by twice coating flow-through honeycomb bodies made from ceramic with 93 cells per $cm^2$ and with a wall thickness of 0.09 mm, as well as dimensions of 11.8 cm in diameter and 10.5 cm in length. To this end, two different suspensions were produced respectively for layers A and B. The support was then first coated with the suspension for layer A and then calcined in air for 4 hours at 500° C. Subsequently, the support coated with layer A was coated with the suspension for layer B and then calcined under the same conditions as for layer A.

EXAMPLE 1

A double-layer catalyst was produced by first producing two suspensions. The composition of the first suspension for layer A (relative to the volume of the catalyst support) was:
40 g/L of activated aluminum oxide stabilized with 4 wt % of $La_2O_3$
40 g/L of cerium/zirconium/lanthanum/yttrium mixed oxide with 25 wt % $CeO_2$, 67.5 wt % $ZrO_2$; 3.5 wt % $La_2O_3$, and 4 wt % $Y_2O_3$
5 g/L of $BaSO_4$
3.178 g/L of Pd The composition of the second suspension for layer B (relative to the volume of the catalyst support) was:
60 g/L of activated aluminum oxide stabilized with 4 wt % of $La_2O_3$
47 g/L of cerium/zirconium/lanthanum/yttrium mixed oxide with 24 wt % $CeO_2$, 60 wt % $ZrO_2$, 3.5 wt % $La_2O_3$, and 12.5 wt % $Y_2O_3$
0.177 g/L of Pd
0.177 g/L of Rh

EXAMPLE 2

A double-layer catalyst was produced analogously to example 1. The composition of the first suspension for layer A was:
40 g/L of activated aluminum oxide stabilized with 4 wt % of $La_2O_3$
40 g/L of cerium/zirconium/lanthanum/yttrium mixed oxide with 20.5 wt % $CeO_2$, 67.5 wt % $ZrO_2$, 4.5 wt % $La_2O_3$, and 7.5 wt % $Y_2O_3$
5 g/L of $BaSO_4$
3.178 g/L of Pd The composition of the second suspension for layer B was:
60 g/L of activated aluminum oxide stabilized with 4 wt % of $La_2O_3$
47 g/L of cerium/zirconium/lanthanum/yttrium mixed oxide with 20 wt % $CeO_2$, 60 wt % $ZrO_2$, 5 wt % $La_2O_3$ and 15 wt % $Y_2O_3$
0.177 g/L of Pd
0.177 g/L of Rh

EXAMPLE 3

A double-layer catalyst was produced analogously to example 1. The composition of the first suspension for layer A was:
40 g/L of activated aluminum oxide stabilized with 4 wt % of $La_2O_3$
40 g/L of cerium/zirconium/lanthanum/yttrium mixed oxide with 20.5 wt % $CeO_2$, 67.5 wt % $ZrO_2$, 4.5 wt % $La_2O_3$, and 7.5 wt % $Y_2O_3$
5 g/L of $BaSO_4$
3.178 g/L of Pd The composition of the second suspension for layer B was:
60 g/L of activated aluminum oxide stabilized with 4 wt % of $La_2O_3$
47 g/L of cerium/zirconium/lanthanum/yttrium mixed oxide with 15 wt % $CeO_2$, 60 wt % $ZrO_2$, 7 wt % $La_2O_3$, and 18 wt % $Y_2O_3$
0.177 g/L of Pd
0.177 g/L of Rh

COMPARATIVE EXAMPLE 1

A double-layer catalyst was produced analogously to example 1. The composition of the first suspension for layer A was:
40 g/L of activated aluminum oxide stabilized with 4 wt % of $La_2O_3$
40 g/L of cerium/zirconium/lanthanum/yttrium mixed oxide with 25 wt % $CeO_2$, 67.5 wt % $ZrO_2$, 3.5 wt % $La_2O_3$, and 4 wt % $Y_2O_3$
5 g/L of $BaSO_4$
3.178 g/L of Pd The composition of the second suspension for layer B was:
60 g/L of activated aluminum oxide stabilized with 4 wt % of $La_2O_3$
47 g/L of cerium/zirconium/lanthanum/yttrium mixed oxide with 25 wt % $CeO_2$, 67.5 wt % $ZrO_2$, 3.5 wt % $La_2O_3$, and 4 wt % $Y_2O_3$
0.177 g/L of Pd
0.177 g/L of Rh Example 1 and comparative example 1 were aged in an engine test bench aging process. The aging process consists of an overrun fuel cut-off aging with an exhaust gas temperature of 950° C. in front of the catalyst inlet (1,030° C. maximum bed temperature). The aging time was 76 hours.

The start-up performance was tested on an engine test bench at a constant average air/fuel ratio λ, and the dynamic conversion was tested with changes of λ. Table 1 contains the temperatures $T_{50}$ at which 50% respectively of the considered components are converted. In so doing, the start-up performance was determined with a stoichiometric exhaust gas composition (λ=0.999 with ±3.4% amplitude).

TABLE 1

Results of the start-up performance after aging for example 1 and comparative example 1

|  | $T_{50}$ HC stoichiometric | $T_{50}$ CO stoichiometric | $T_{50}$ NOx stoichiometric |
|---|---|---|---|
| Comparative example 1 | 391 | 402 | 398 |
| Example 1 | 381 | 391 | 388 |

The dynamic conversion performance was determined in a range for λ of 0.99 to 1.01 at a constant temperature of 510° C. In so doing, the amplitude of λ was ±3.4%. Table 2 contains the conversion at the point of intersection of the CO and NOx conversion curves, as well as the associated HC conversion.

TABLE 2

Results of the dynamic conversion performance after aging for example 1 and comparative example 1

|  | CO/NOx conversion at the point of intersection | HC conversion at λ of the CO/NOx point of intersection |
|---|---|---|
| Comparative example 1 | 73.5% | 92 |
| Example 1 | 79% | 93 |

Example 1 according to the invention shows a significant improvement in the start-up performance and in the dynamic CO/NOx conversion after aging.

In the following examples 4 and 5, and in comparative example 2, double-layer catalysts were produced by twice coating flow-through honeycomb bodies made from ceramic with 93 cells per cm$^2$ and with a wall thickness of 0.1 mm, as well as dimensions of 10.2 cm in diameter and 15.2 cm in length, To this end, two different suspensions were produced respectively for layer A and B. The support was then first coated with the suspension for layer A and then calcined in air for 4 hours at 500° C. Subsequently, the support coated with layer A was coated with the suspension for layer B and then calcined under the same conditions as for layer A.

EXAMPLE 4

A double-layer catalyst was produced by first producing two suspensions. The composition of the first suspension for layer A (relative to the volume of the catalyst support) was:
  70 g/L of activated aluminum oxide stabilized with 4 wt % of $La_2O_3$
  50 g/L of cerium/zirconium/lanthanum/yttrium mixed oxide with 39 wt % $CeO_2$, 51 wt % $ZrO_2$, 3 wt % $La_2O_3$, and 7 wt % $Y_2O_3$
  5 g/L of $BaSO_4$
  1.483 g/L of Pd The composition of the second suspension for layer B (relative to the volume of the catalyst support) was:
  70 g/L of activated aluminum oxide stabilized with 4 wt % of $La_2O_3$
  65 g/L of cerium/zirconium/lanthanum/yttrium mixed oxide with 24 wt % $CeO_2$, 60 wt % $ZrO_2$, 3.5 wt % $La_2O_3$, and 12.5 wt % $Y_2O_3$
  0.177 g/L of Pd
  0.177 g/L of Rh

EXAMPLE 5

A double-layer catalyst was produced analogously to example 4. The composition of the first suspension for layer A was:
  70 g/L of activated aluminum oxide stabilized with 4 wt % of $La_2O_3$
  50 g/L of cerium/zirconium/lanthanum/yttrium mixed oxide with 25 wt % $CeO_2$, 67.5 wt % $ZrO_2$, 3.5 wt % $La_2O_3$, and 4 wt % $Y_2O_3$
  5 g/L of $BaSO_4$
  1.483 g/L of Pd The composition of the second suspension for layer B was:
  70 g/L of activated aluminum oxide stabilized with 4 wt % of $La_2O_3$
  65 g/L of cerium/zirconium/lanthanum/yttrium mixed oxide with 24 wt % $CeO_2$, 60 wt % $ZrO_2$, 3.5 wt % $La_2O_3$, and 12.5 wt % $Y_2O_3$
  0.177 g/L of Pd
  0.177 g/L of Rh

COMPARATIVE EXAMPLE 2

A double-layer catalyst was produced analogously to example 4. The composition of the first suspension for layer A was:
  70 g/L of activated aluminum oxide stabilized with 4 wt % of $La_2O_3$
  50 g/L of cerium/zirconium/lanthanum/yttrium mixed oxide with 39 wt % $CeO_2$, 51 wt % $ZrO_2$, 3 wt % $La_2O_3$, and 7 wt % $Y_2O_3$
  5 g/L of $BaSO_4$
  1.483 g/L of Pd The composition of the second suspension for layer B was:
  70 g/L of activated aluminum oxide stabilized with 4 wt % of $La_2O_3$
  65 g/L of cerium/zirconium/lanthanum/yttrium mixed oxide with 22 wt % $CeO_2$, 68 wt % $ZrO_2$, 2 wt % $La_2O_3$, 5 wt % $Nd_2O_3$, and 3 wt % $Y_2O_3$
  0.177 g/L of Pd
  0.177 g/L of Rh Examples 4 and 5, as well as comparative example 2, were aged in an engine test bench aging process. The aging process consists of an overrun fuel cut-off aging with an exhaust gas temperature of 950° C. in front of the catalyst inlet (1,030° C. maximum bed temperature). The aging time was 76 hours.

The start-up performance was tested on an engine test bench at a constant average air/fuel ratio $\lambda$, and the dynamic conversion was tested with changes in $\lambda$.

Table 3 contains the temperatures T50 at which 50% respectively of the considered components are converted. In so doing, the start-up performance was determined with stoichiometric exhaust gas composition ($\lambda=0.999$ with ±3.4% amplitude) and with slightly lean exhaust gas composition ($\lambda=1.05$ without amplitude).

TABLE 3

Results of the start-up performance after aging for examples 4 and 5 and comparative example 2

|  | T50 HC stoichio-metric | T50 CO stoichio-metric | T50 NOx stoichio-metric | T50 HC lean | T50 CO lean |
|---|---|---|---|---|---|
| Comparative example 2 | 403 | 420 | 416 | 383 | 382 |
| Example 4 | 391 | 411 | 401 | 371 | 369 |
| Example 5 | 384 | 397 | 392 | 370 | 369 |

The dynamic conversion performance was determined in a range for $\lambda$ of 0.99 to 1.01 at a constant temperature of 510° C. In so doing, the amplitude of $\lambda$ was ±3.4%. Table 4 contains the conversion at the point of intersection of the CO and NOx conversion curves, as well as the associated HC conversion.

TABLE 4

Results of the dynamic conversion performance after aging for examples 4 and 5 and comparative example 2

|  | CO/NOx point of intersection | HC conversion at $\lambda$ of the CO/NOx point of intersection |
|---|---|---|
| Comparative example 2 | 81.5% | 95% |
| Example 4 | 86.5% | 95.5% |
| Example 5 | 95% | 96.5% |

Examples 4 and 5 according to the invention show a significant improvement in the startup performance and in the dynamic CO/NOx conversion after aging, wherein example 5 shows the greatest activity.

Further examples were prepared analogously to example 5, with the difference being that rare-earth metal oxides ($SE_xO_y$), as specified in Table 5, were used in the cerium/zirconium/rare-earth metal mixed oxides,

TABLE 5

| Example | Layer | wt % of $CeO_2$ | wt % of $ZrO_2$ | $SE_xO_y$ 1 | wt % | $SE_xO_y$ 2 | wt % |
|---|---|---|---|---|---|---|---|
| 6 | A | 40 | 50 | $La_2O_3$ | 5 | — | — |
|   | B | 30 | 55 | $La_2O_3$ | 12 | — | — |
| 7 | A | 40 | 50 | $Y_2O_3$ | 7.5 | — | — |
|   | B | 30 | 55 | $Y_2O_3$ | 15 | — | — |
| 8 | A | 40 | 50 | $La_2O_3$ | 5 | $Pr_6O_{11}$ | 5 |
|   | B | 30 | 55 | $La_2O_3$ | 5 | $Pr_6O_{11}$ | 10 |
| 9 | A | 30 | 63 | $La_2O_3$ | 2 | $Nd_2O_3$ | 5 |
|   | B | 25 | 60 | $La_2O_3$ | 5 | $Nd_2O_3$ | 10 |
| 10 | A | 30 | 62 | $Nd_2O_3$ | 3 | $Pr_6O_{11}$ | 5 |
|   | B | 30 | 57 | $Nd_2O_3$ | 5 | $Pr_6O_{11}$ | 8 |
| 11 | A | 40 | 54 | $La_2O_3$ | 3 | $Sm_2O_3$ | 3 |
|   | B | 30 | 55 | $La_2O_3$ | 5 | $Sm_2O_3$ | 10 |
| 12 | A | 40 | 51.5 | $Nd_2O_3$ | 3.5 | $Y_2O_3$ | 5 |
|   | B | 30 | 55 | $Nd_2O_3$ | 5 | $Y_2O_3$ | 10 |

The invention claimed is:

1. Catalyst comprising two layers on an inert catalyst support, wherein
   a layer A contains at least one platinum group metal, and a cerium/zirconium/SE mixed oxide, and
   a layer B applied to layer A contains at least one platinum group metal, and a cerium/zirconium/SE mixed oxide,
   wherein SE stands for a rare-earth metal other than cerium,
   wherein the proportion of the SE oxide in the cerium/zirconium/SE mixed oxide of layer A is less than the proportion of the SE oxide in the cerium/zirconium/SE mixed oxide of layer B, calculated respectively in wt % and relative to the cerium/zirconium/SE mixed oxide.

2. Catalyst according to claim 1, wherein layer A and layer B, independently of each other, contain, as platinum group metal, platinum, palladium, rhodium, or mixtures of at least two of these platinum group metals.

3. Catalyst according to claim 1, wherein, as platinum group metal, layer A contains platinum, palladium, or platinum and palladium, and layer B contains palladium, rhodium, or palladium and rhodium.

4. Catalyst according to claim 1, wherein, as platinum group metal, layer A contains palladium, and layer B contains rhodium, or palladium and rhodium.

5. Catalyst according to claim 1, wherein layer A and layer B contain active aluminum oxide.

6. Catalyst according to claim 5, wherein the platinum group metal in layer A and/or in layer B is supported wholly or in part on active aluminum oxide.

7. Catalyst according to claim 1, wherein the SE oxide in the cerium/zirconium/SE mixed oxide is lanthanum oxide, yttrium oxide, praseodymium oxide, neodymium oxide, samarium oxide, or mixtures of one or more of these metal oxides.

8. Catalyst according to claim 1, wherein the SE oxide in the cerium/zirconium/SE mixed oxide is a mixture of lanthanum oxide and yttrium oxide.

9. Catalyst according to claim 1, wherein the proportion of the SE oxide in the cerium/zirconium/SE mixed oxide in layer A is 1 to 12 wt % relative to the cerium/zirconium/SE mixed oxide in each case.

10. Catalyst according to claim 1, wherein the proportion of the SE oxide in the cerium/zirconium/SE mixed oxide in layer B is 2 to 25 wt % relative to the cerium/zirconium/SE mixed oxide in each case.

11. Catalyst according to claim 1, wherein the weight ratio of cerium oxide to zirconium oxide in the cerium/zirconium/SE mixed oxide in layer A is 0.2 to 0.7.

12. Catalyst according to claim 1, wherein the weight ratio of cerium oxide to zirconium oxide in the cerium/zirconium/SE mixed oxide in layer B is 0.2 to 0.7.

13. Catalyst according to claim 1, wherein
   layer A contains palladium, active aluminum oxide, and a cerium/zirconium/lanthanum/yttrium mixed oxide, and
   layer B applied to layer A contains rhodium, or palladium and rhodium, active aluminum oxide, and a cerium/zirconium/lanthanum/yttrium mixed oxide,
   wherein the proportion of the sum of lanthanum oxide and yttrium oxide in the cerium/zirconium/lanthanum/yttrium mixed oxide of layer A is less than the proportion of the sum of lanthanum oxide and yttrium oxide in the cerium/zirconium/lanthanum/yttrium mixed oxide of layer B, calculated respectively in wt % and relative to the cerium/zirconium/lanthanum/yttrium oxide.

14. Catalyst according to claim 13, wherein the proportion of the sum of lanthanum oxide and yttrium oxide in the cerium/zirconium/lanthanum/yttrium mixed oxide of layer A is 6 to 9 wt % relative to the cerium/zirconium/lanthanum/yttrium mixed oxide of layer A, and 14 to 18 wt % in the cerium/zirconium/lanthanum/yttrium mixed oxide of layer B relative to the cerium/zirconium/lanthanum/yttrium mixed oxide of layer B, calculated in each case in wt % and relative to the cerium/zirconium/lanthanum/yttrium mixed oxide.

15. Catalyst according to claim 1, wherein layer A lies directly on the inert catalyst support.

16. Catalyst according to claim 1, wherein the proportion of the SE oxide in the cerium/zirconium/SE mixed oxide in layer A is 3 to 10 wt % relative to the cerium/zirconium/SE mixed oxide in each case.

17. Catalyst according to claim 1, wherein the proportion of the SE oxide in the cerium/zirconium/SE mixed oxide in layer A is 6 to 9 wt % relative to the cerium/zirconium/SE mixed oxide in each case.

18. Catalyst according to claim 1, wherein the proportion of the SE oxide in the cerium/zirconium/SE mixed oxide in layer B is 10 to 20 wt % relative to the cerium/zirconium/SE mixed oxide in each case.

19. Catalyst according to claim 1, wherein the proportion of the SE oxide in the cerium/zirconium/SE mixed oxide in layer B is 14 to 18 wt % relative to the cerium/zirconium/SE mixed oxide in each case.

20. Catalyst according to claim 1, wherein the weight ratio of cerium oxide to zirconium oxide in the cerium/zirconium/SE mixed oxide in layer A is 0.3 to 0.5.

21. Catalyst according to claim 1, wherein the weight ratio of cerium oxide to zirconium oxide in the cerium/zirconium/SE mixed oxide in layer B is 0.3 to 0.5.

* * * * *